No. 716,527. Patented Dec. 23, 1902.
H. D. ELLS.
DUST GUARD FOR CARRIAGE AXLES.
(Application filed June 16, 1902.)
(No Model.)
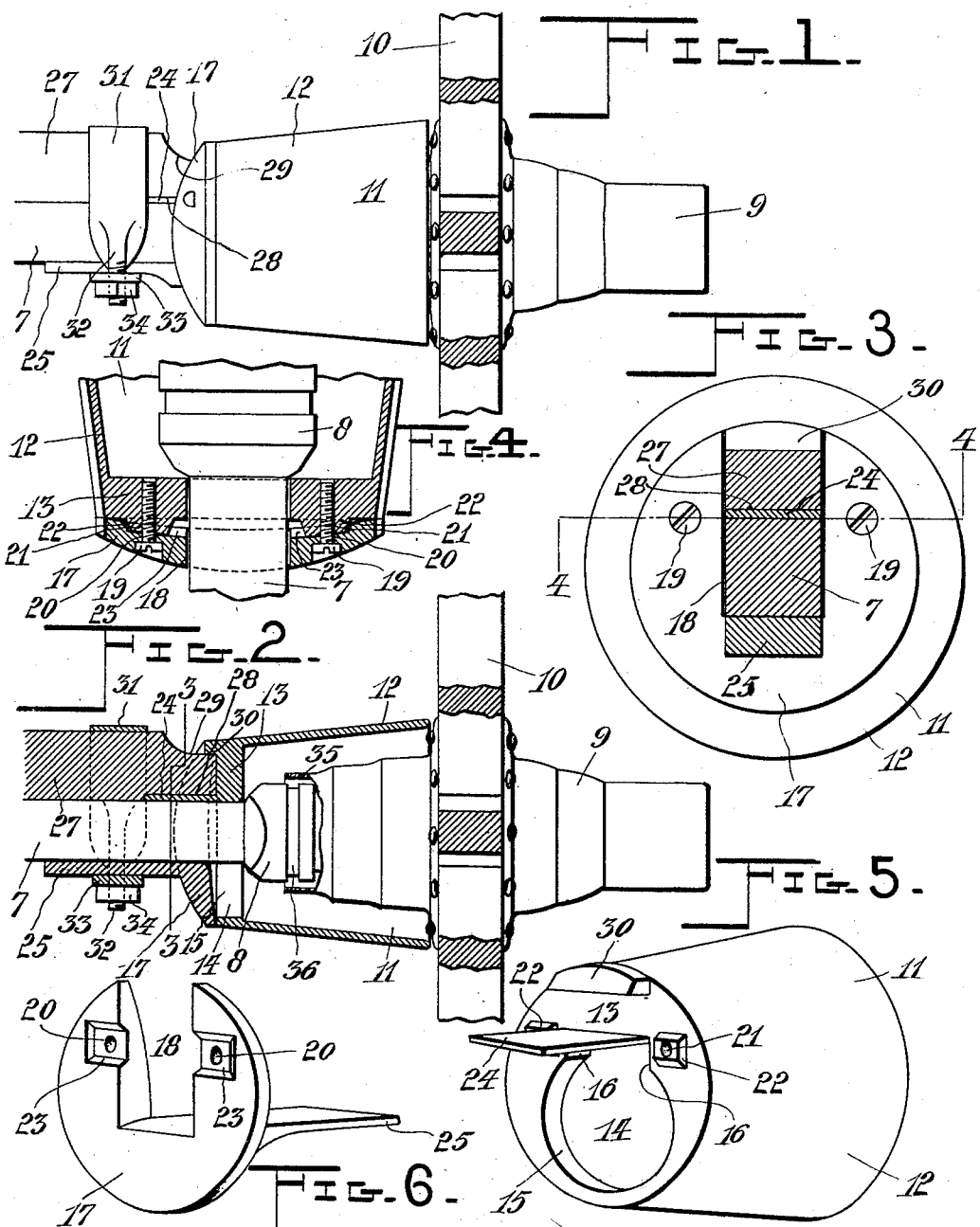
Witnesses: Hallett D. Ells. Inventor,
By Marion & Marion
Attorneys

UNITED STATES PATENT OFFICE.

HALLETT D. ELLS, OF BARRINGTON, CANADA.

DUST-GUARD FOR CARRIAGE-AXLES.

SPECIFICATION forming part of Letters Patent No. 716,527, dated December 23, 1902.

Application filed June 16, 1902. Serial No. 111,813. (No model.)

*To all whom it may concern:*

Be it known that I, HALLETT D. ELLS, a subject of the King of England, residing at Barrington, county of Shelburne, Province of Nova Scotia, Canada, have invented certain new and useful Improvements in Dust-Guards for Carriage-Axles; and I do hereby declare that the following is a full, clear, and exact description of the invention, such as will enable others skilled in the art to which it appertains to make and use the same.

My invention relates to a guard for the axles of wheeled vehicles especially intended to cover the joint between the hub and axle of the wheel, so as to prevent the access of dust thereto.

The object of my invention is to produce a dust-guard which shall be an improvement on anything hitherto in use, both in the amount of protection it offers against dust, as well as in the ease with which it may be slipped over the axle and keyed in place thereon.

To these ends my invention consists in a cup-shaped structure which has a button-hole-orifice in its base adapted to be slipped over the axle-collar and to be pushed down centrally onto the axle in combination with a pair of other pieces which coöperate with said cup-shaped piece to key the latter in place, the cup or bell of the said cup-shaped piece being arranged to extend over and fully cover the inner portion of the vehicle-hub.

My invention further consists in the construction and combination of parts hereinafter described, and more particularly pointed out in the claims attached to this specification.

In the drawings accompanying this specification I have shown the preferred form of my invention, and herein—

Figure 1 is a side elevation of an axle and part of a vehicle-wheel provided with my improved dust-guard. Fig. 2 is a vertical longitudinal central section through the dust-guard, showing the axle and hub in elevation, parts being broken away. Fig. 3 is a transverse section through the axle and a portion of the dust-guard, taken on the line 3 3 of Fig. 2. Fig. 4 is a longitudinal central section through the dust-guard in a horizontal plane on the line 4 4 of Fig. 3, the axle being shown in elevation. Fig. 5 is a perspective view of the cup-shaped member, and Fig. 6 is a similar view of the cap.

The same numerals of reference denote like parts in all the figures of the drawings.

The axle is designated by the numeral 7, being rectangular in cross-section and provided with the usual axle-collar 8 thereon at the base of the axle-arm, on which is mounted the hub 9 of the wheel 10. The cup-shaped member constituting the principal piece of the dust-guard is indicated by the numeral 11 and is arranged at the base of the collar 8 and on the inner side of the same and keyed fast to the axle, and has an axial somewhat-tapered flange 12, which projects outwardly and over the inner end of the hub as far as possible—that is to say, to the inner side of the spokes. This member 11 has a heavy circular base 13, which is provided with a non-central buttonhole-orifice 14 therein, this orifice consisting of an eccentric circular bore 15 of just sufficient size to receive and pass over the axle-collar 8 and a rectangular seat 16, projecting from that side of the bore 15 which is nearest the center and of the same size as the rectangular portion of the axle 7, so that when pushed down upon the latter in the manner shown in Fig. 2 the cup-shaped member 11 is coaxial with the axle 7. It is retained in this position by the cap 17, which has a transverse rectangular slot 18 passing through the center thereof from one side to a point somewhat beyond the center, this slot 18 being also of the same width as the axle 7 and its depth being such that when slid over the axle as far as possible it will be also coaxial therewith in the manner shown in Figs. 2 and 3, and it may then be secured in this position by a pair of screws 19, passing through apertures 20 in the cap 17 at the sides of the slot 18 and seated in threaded sockets 21, formed in the base 13 of the member 11. This base is also preferably provided with a pair of upstanding tapered lugs or bosses 22 of square section, which coact with similarly-formed recesses 23 on the rear face of the cap 17, thus assisting in properly joining the cap 17 to the member 11. In order to hold the guard thus formed in parallel relation to the axis, I further provide a pair of tongues 24 and 25, provided on the members 11 and 17, respectively, and extending horizontally from the base of the slots 16 and 18, these being disposed on the upper and lower sides of the axle 7, respectively, so that when the two members 11 and 17 are secured together, as above described, they will be held firmly coaxial with the axle 7 and prevented from wabbling. In order, further, to hold the parts in position on the axle and prevent them from sliding longitudinally thereon, I provide a key-block 27, which is recessed on its lower side, as shown at 28, to receive the tongue 24 and is tapered at its outer end, as shown at 29, in order to enable it to fit between the tongue 24 and a transverse lug 30, which is raised upon the inner side of the base 13 of the member 11, so as to form a socket for the tapered end 29 of the key 27. The whole is now bound firmly to the axle by the U-shaped clip 31, having threaded legs 32, over which is passed a plate 33 on the under side of the tongue 25 and a pair of nuts 34, which are adapted to be tightened over the plate 33, so as to draw the parts firmly together.

It will be seen that the annular flange 12 of the member 11 acts as a shield to prevent the entrance of dust around the axle-collar 8, while of course it does not prevent the use of the ordinary additional safeguards formed at the joint—such, for instance, as the hub-flange 35 and the groove 36 in the axle-collar.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A dust-guard for vehicle-wheels comprising a cup-shaped member having a button-hole-orifice in its base with a rectangular seat fitting the axle and an eccentric circular portion sufficiently large to pass over the axle-collar, whereby said cup-shaped member is enabled to be seated firmly on the axle, a cap member having a transverse slot adapted to be passed over and to fit the axle, and screws passing through the cap and the base of said cup-shaped member and securing them together.

2. A dust-guard for vehicle-wheels comprising a cup-shaped member having a button-hole-orifice in its base adapted to pass over the axle-collar and to seat said cup-shaped member firmly on the axle, a cap member having a transverse slot adapted to be passed over the axle, means for securing said cap to the base of said cup-shaped member, and a pair of tongues extending respectively from the cup-shaped member and cap on opposite sides of the axle and parallel thereto to hold the parts in coaxial relation with the axle.

3. A dust-guard for vehicle-wheels comprising a cup-shaped member having a button-hole-orifice in its base adapted to pass over the axle-collar and to seat said cup-shaped member firmly on the axle, a cap member having a transverse slot adapted to be passed over the axle, means for securing said cap to the base of said cup-shaped member, a pair of tongues extending respectively from the cup-shaped member and cap on opposite sides of the axle and parallel thereto to hold the parts in coaxial relation with the axle, a key-piece adapted to be seated on the axle and on one of said tongues, and a clip passing around said key-piece and adapted to clamp said key-piece and the other members firmly in place on the axle, substantially as described.

In witness whereof I have hereunto set my hand in the presence of two witnesses.

HALLETT D. ELLS.

Witnesses:
F. W. HOMER,
JOSEPH HOMER.